United States Patent
Wohlfeil et al.

(10) Patent No.: US 10,001,601 B2
(45) Date of Patent: Jun. 19, 2018

(54) DEVICE FOR COUPLING A PLURALITY OF DIFFERENT FIBRE MODES

(71) Applicant: IHP GMBH—INNOVATIONS FOR HIGH PERFORMANCE MICROELECTRONICS/LEIBNIZ-INSTITUT FÜR INNOVATIVE MIKROELEKTRONIK, Frankfurt (Oder) (DE)

(72) Inventors: Benjamin Wohlfeil, Berlin (DE); Lars Zimmermann, Berlin (DE)

(73) Assignee: IHP GMBH—INNOVATIONS FOR HIGH PERFORMANCE MICROELECTRONICS/LEIBNIZ-INSTITUT FÜR INNOVATIVE MIKROELEKTRONIK, Frankfurt (DE)

( * ) Notice: Subject to any disclaimer, the term of this patent is extended or adjusted under 35 U.S.C. 154(b) by 0 days. days.

(21) Appl. No.: 14/771,631

(22) PCT Filed: Mar. 3, 2014

(86) PCT No.: PCT/EP2014/054079
§ 371 (c)(1),
(2) Date: Feb. 11, 2016

(87) PCT Pub. No.: WO2014/131910
PCT Pub. Date: Sep. 4, 2014

(65) Prior Publication Data
US 2016/0266316 A1      Sep. 15, 2016

(30) Foreign Application Priority Data

Mar. 1, 2013   (DE) .................. 10 2013 203 581
Jun. 28, 2013   (DE) .................. 10 2013 212 752

(51) Int. Cl.
*G02B 6/12*  (2006.01)
*G02B 6/26*  (2006.01)
(Continued)

(52) U.S. Cl.
CPC ............. *G02B 6/268* (2013.01); *G02B 6/124* (2013.01); *G02B 6/14* (2013.01); *G02B 6/29323* (2013.01);
(Continued)

(58) Field of Classification Search
CPC ...................... G02B 6/29323; G02B 6/29344; G02B 6/268; G02B 6/124; G02B 6/14;
(Continued)

(56) References Cited

U.S. PATENT DOCUMENTS 7,194,166 B1 *   3/2007   Gunn, III ............. G02B 6/4204
                                                                    385/31
7,539,373 B1      5/2009   Logvin et al.
(Continued)

FOREIGN PATENT DOCUMENTS

JP      2004235988 A     8/2004
WO     2008/122607 A1   10/2008
WO     2009/156412 A1   12/2009

OTHER PUBLICATIONS

H. Chen et al. "Integrated Mode Group Division Multiplexer and Demultiplexer Based on 2-Dimensional Vertical Grating Couplers", ECOC 2012 Technical Digest, Th1B2, European Conference and Exhibition on Optical Communication 2012, Amsterdam Netherlands, Sep. 16-20, 2012.*
(Continued)

*Primary Examiner* — Rhonda Peace
(74) *Attorney, Agent, or Firm* — Ware, Fressola, Maguire & Barber LLP (57) ABSTRACT

An integrated optical coupler device comprising, on a substrate surface: an integrated optical coupling grating extend-
(Continued)

ing in lateral directions parallel to the substrate surface and which, by diffraction at its grating structures, either converts electromagnetic waves, guided parallel to the substrate surface, of at least two waveguide modes of integrated optical waveguides into fiber modes propagating perpendicularly to the substrate surface, or converts electromagnetic waves, propagating perpendicularly to the substrate surface, of a fiber mode into electromagnetic waves, propagating parallel to the substrate surface, of at least two waveguide modes, and a first conductor pair, connected to the coupling grating and formed by a first and a second integrated optical waveguide, through which, in mutually opposite first and second directions parallel to the substrate surface, electromagnetic waves of at least two waveguide modes can be conducted to the coupling grating or can be conducted away from the coupling grating.

21 Claims, 7 Drawing Sheets

(51) Int. Cl.
    *G02B 6/293*     (2006.01)
    *G02B 6/124*     (2006.01)
    *G02B 6/14*     (2006.01)
    *G02B 6/30*     (2006.01)

(52) U.S. Cl.
    CPC ...... *G02B 6/30* (2013.01); *G02B 2006/12152* (2013.01); *G02B 2006/12159* (2013.01)

(58) Field of Classification Search
    CPC ............ G02B 6/30; G02B 2006/12152; G02B 2006/12159
    See application file for complete search history.

(56) References Cited

U.S. PATENT DOCUMENTS

| | | | | |
|---|---|---|---|---|
| 9,103,973 | B2* | 8/2015 | Fattal | G02B 5/1809 |
| 9,239,507 | B2* | 1/2016 | Chen | G02B 6/30 |
| 2009/0290837 | A1* | 11/2009 | Chen | G02B 6/34 |
| | | | | 385/37 |
| 2012/0155805 | A1* | 6/2012 | Doerr | G02B 6/29323 |
| | | | | 385/37 |
| 2012/0224805 | A1 | 9/2012 | Doerr | |
| 2016/0266316 | A1* | 9/2016 | Wohlfeil | G02B 6/29323 |
| 2016/0306115 | A1* | 10/2016 | Koonen | G02B 6/124 |

OTHER PUBLICATIONS

H. Chen. "Optical Devices and Subsystems for Few- and Multi-mode Fiber based Networks", Dissertation at Eindhoven University of Technology, 2014. Retrieved via https://pure.tue.nl/ws/files/3806896/773124.pdf. Excerpted pp. 31-32, 56-60, 116.*
B. Wohlfeil et al. "A Two-Dimensional Fiber Grating Coupler on SOI for Mode Division Multiplexing", IEEE Photonics Technology Letters, vol. 28, No. 11, Jun. 1, 2016.*
Yunhong Ding, et al; "On-chip mode multiplexer based on a single grating coupler", Photonics Conference (PIC), 2012 IEEE; Sep. 23, 2012; pp. 707-708.
Werner Klaus, et al; "Free-space Coupling Optics for Multi-core Fibers"; National Institute of Information and Communications Technology; IEEE, 2012; pp. 230-231.
C.R. Doerr, et al; "Silicon photonic integrated circuit for coupling to a ring-core multimode fiber for space-division multiplexing"; Optical Society of America; Sep. 19, 2011; pp. 1-3.
Nicolas K. Fontaine, et al; "Space-division multiplexing and all-optical MIMO demultiplexing using a photonic integrated circuit"; Optical Society of America; 2012; whole document.

* cited by examiner

Fig. 10

DEVICE FOR COUPLING A PLURALITY OF DIFFERENT FIBRE MODES

CROSS REFERENCE TO RELATED APPLICATIONS

This application is the U.S. National Stage of International Application Number PCT/EP2014/054079 filed on Mar. 3, 2014 which application claims priority under 35 USC § 119 to German Patent Application No. 102013203581.0 filed on Mar. 1, 2013 and German Patent Application No. 102013212752.9 filed on Jun. 28, 2013. Each of these applications are hereby incorporated by reference in their entirety.

TECHNICAL FIELD

The invention relates to an integrated optical coupler device, more particularly for use as a coupling interface between integrated optical waveguides and an optical multimode fiber.

BACKGROUND OF THE INVENTION

The only degree of freedom that has not yet been exploited for data transmission in fiber-optic systems is the spatial dimension, which is why space-division multiplexing (SDM) is currently the subject of numerous investigations. Space-division multiplexing includes not only the transmission of data in one fiber having a plurality of fiber cores, but also the transmission of data in one fiber core conducting a plurality of propagatable modes, or a combination of both types of transmission. Coupling light into and out of such fibers has emerged as a particular problem for both types of space-division multiplexing.

The publication by W. Klaus et al. entitled "Free-space Coupling Optics for Multi-core Fibers", IEEE Summer Topicals 2012, describes a free-space coupling device for coupling a plurality (up to 19) of standard single-mode fibers to a 19-core fiber. This solution provides a high level of efficiency, but it is easy to see that it is very complex, as well as cost-intensive.

An integrated optical system may be of assistance here: C. Doerr et al., in the publication entitled "Silicon photonic integrated circuit for coupling to a ring-core multimode fiber for space-division multiplexing", ECOC 2011, shows an integrated optical circuit which can excite different modes in multimode fibers with the aid of a grating coupler, by using a circular 1D grating coupler with many input/output waveguides fed with different phases, with the result that ring modes are excited in the fiber. This solution is elegant, but requires a large chip area and generates only the rather uncommon ring modes in only one polarization.

The publication entitled "Space-division multiplexing and all-optical MIMO demultiplexing using a photonic integrated circuit", OFC 2012, likewise by C. Doerr et al., reports on an arrangement of three 2D grating couplers which, when properly arranged, are capable of generating a plurality of fiber modes simultaneously. In contrast to the previous arrangement, the LP fiber modes are generated in this case in both polarizations. However, the arrangement is disadvantageous in that the three coupling gratings must radiate simultaneously with the correct amplitude and phase onto the fiber core, which either involves a very large fiber core and concomitantly unfavorable properties when propagating the modes along the fibers, or requires very small and thus inefficient grating couplers. As can be seen from the publication, the grating couplers generate the desired fiber modes only approximately, which means that some of the input power is either lost, or crosstalks to other fiber modes.

SUMMARY OF THE INVENTION

According to the invention, an integrated optical coupler device is proposed for use as a coupling interface between integrated optical waveguides and an optical multimode fiber, comprising, on a substrate surface:
an integrated optical coupling grating extending in lateral directions parallel to the substrate surface and which, by diffraction at its grating structures, depending on the coupling direction, either converts electromagnetic waves, guided parallel to the substrate surface, of at least two waveguide modes of integrated optical waveguides into fiber modes, more particularly LP fiber modes, propagating perpendicularly to the substrate surface, or converts electromagnetic waves, propagating perpendicularly to the substrate surface, of a fiber mode, more particularly of an LP fiber mode, into electromagnetic waves, propagating parallel to the substrate surface, of at least two waveguide modes, and
a first conductor pair, which is connected to the coupling grating at mutually opposite first and second sides of the coupling grating and which is formed by a first and a second integrated optical waveguide, through which, in mutually opposite first and second directions parallel to the substrate surface, electromagnetic waves of at least two waveguide modes can be conducted to the coupling grating or can be conducted away from the coupling grating.

The integrated optical coupler device according to the invention is used to convert modes between a multimode fiber and an integrated optical waveguide structure. It can be operated selectively in the two opposite directions, that is to say,
  a) for coupling light from an integrated optical waveguide structure into an optical multimode fiber, or
  b) for coupling light from an optical multimode fiber into an integrated optical waveguide structure.

In its first function, it allows electromagnetic waves of different modes to be coupled into an optical multimode fiber using one and the same coupler device.

In its alternative, second, function, it allows electromagnetic waves of different fiber modes to be coupled out of a multimode fiber into an integrated optical waveguide using the one and the same coupler device.

With the integrated optical coupler device according to the invention, it is possible to provide a device which can be produced at low cost and which can couple different fiber modes with a high level of efficiency into a multimode fiber, even simultaneously, without the fiber having to have a particularly large core diameter.

The solution according to the invention is further characterized by being embodied as an integrated optical waveguide and as a result is simple and inexpensive to produce. The structure is not composed of individual parts, so individual components do not have to be separately handled and matched. The coupler device according to the invention does not impose tough requirements on the phase position of the input waves, which allows optical component structure to be particularly simple.

The device according to the invention is based on the idea of generating in the fiber a plurality of intensity maxima whose superposition results in a guided fiber mode, when coupling into a multimode fiber with the aid of the coupler device.

This shall now be described in greater detail with reference to the examples:

If, for example, the respective base modes $TE_{00}$ of the integrated optical waveguide are guided in the conductor pair of the coupler device without a phase shift ($\Delta\varphi=0°$) in mutually opposite directions into the coupling grating, the two waves unite in the coupling grating and generate the fundamental fiber mode $LP_{01}$ in TE polarization. However, if the $TE_{00}$ waves that are fed in have a phase difference of $\Delta\varphi=180°$, the two waves do not unite in the coupling grating to form the $LP_{01}$ fiber mode, but are guided to the fiber as separate intensity maxima with a phase difference and thus produce one of the two possible $LP_{11}$ fiber modes (frequently referred to as $LP_{11,a}$), again in TE polarization.

The other possible $LP_{11}$ fiber mode ($LP_{11,b}$) in TE polarization can be formed in the coupling grating by superposition of $TE_{10}$ modes fed from opposite directions via the conductor pair, for example. It should be noted in this regard that the coupler device according to the invention is adapted to also guide higher, non-fundamental modes in the integrated waveguides of the conductor pair and to diffract them with the aid of one and the same coupling grating. The waveguides each have two spaced-apart intensity maxima, when looking at the waveguide cross-section in the case under consideration here. If these two modes supplied from opposite directions are superposed in the coupling grating without any phase difference ($\Delta\varphi=0°$), two intensity maxima ($+90°$ and $-90°$) cancel each other out, such that the $LP_{11,b}$ fiber mode remains. If the phase difference between the two $TE_{10}$ modes in the two mutually opposite waveguides of the conductor pair is $\Delta\varphi=180°$, then all four intensity maxima are preserved on their way to the multimode fiber and thus generate one of the possible $LP_{21}$ fiber modes, also in TE polarization.

Embodiments of the Inventive coupler device shall now be described. The description of the embodiments is more concentrated on the case in which light is to be coupled from an integrated optical waveguide structure into a multimode fiber with the aid of the coupler device. The alternative case, in which light is coupled out of a multimode fiber into an integrated optical waveguide, and the concomitant splitting into different waveguide modes, ensues automatically by reversing the optical pathways.

In one embodiment, the variability of the coupler device can be further increased by using not just two, but four sides of the coupling grating. The polarization can also be selected in this manner. In such an embodiment of the coupler device according to the invention, the coupling grating is additionally connected to a second conductor pair at mutually opposite third and fourth sides which are different from the first and second sides. The second conductor pair is formed by a third and a fourth integrated optical waveguide, through which, in mutually opposite third and fourth directions parallel to the substrate surface and perpendicular to the first and second directions, electromagnetic waves of at least two waveguide modes can be conducted to the coupling grating or can be conducted away from the coupling grating. In this embodiment, the coupling grating is formed as a two-dimensional coupling grating which has a grating structure in two directions of the grating plane perpendicular to each other and to two of the directions of incidence.

With this embodiment, the number of modes which can be produced by the coupler device in a multimode fiber increases due to the polarization selectivity that is achieved.

With regard to polarization, it is possible when using this embodiment for transverse electrical (TE) modes and transverse magnetic (TM) modes to be coupled, in particular.

In this embodiment, the two-dimensional grating structure preferably has the same periodicity in these two directions of an imaginary grating plane lying parallel to the substrate surface. The structural elements forming the grating, for example holes in a layer which are approximately circular, square or rectangular in shape in different exemplary embodiments, are thus arranged in this case in the two directions perpendicular to each other and spaced equidistant apart from the structural elements most closely adjacent to them.

In one embodiment, the coupling grating has a translucent cover layer on the grating structures, in order to improve the directionality of the coupling grating. A silicon layer, for example, can be used for infrared light in the spectral ranges of interest for telecommunications. The thickness of such a cover layer may range between 100 and 300 nanometers, for example. In one embodiment, an epitaxial silicon cover layer with a thickness of 150 nanometers is deposited on the grating structures.

A person skilled in the art is aware from the prior art of other grating structures that are provided for deflecting the waves between the grating plane parallel to the substrate surface and the direction perpendicular to the substrate surface. These are not described here in any further detail.

The greater the overlap achieved in embodiments of the coupler device between the superposition of the intensity maxima produced and the fiber modes, the greater the efficiency of the coupler device. The design of the coupling grating also exerts an influence in that regard. The efficiency of such coupling gratings, that is say the ratio of scattered light power in the direction perpendicular to the grating plane to the incident light power in the grating plane, is more than 0.5 in embodiments of the invention, for example 0.6. Well-balanced efficiency for all the relevant modes in the particular application can be achieved by appropriately designing the coupling grating so that a mode overlap of 80% can be achieved. A higher efficiency of up to 90% can only be achieved for individual modes with the aid of special gratings, but the efficiency for other modes is reduced as a result, and the functionality of the coupler device as a whole is adversely affected.

One preferred embodiment of the coupler device has, in addition, an integrated optical conditioning device for conditioning the waveguide modes. The conditioning device has more than two coupling ports assigned to each conductor pair, for coupling in and coupling out electromagnetic waves from or to the outside. In one example, the number of coupling ports provided is double the number of waveguides in the conductor pair. In that example, there are four coupling ports in a coupler device having only one conductor pair. In an embodiment comprising two conductor pairs, there are eight coupling ports. Each of the coupling ports is connected to both waveguides of the conductor pair assigned to it. The conditioning device assigns a conditioning path to each coupling port by being adapted, depending on the coupling port used in the conditioning path, a) either to convert between a fundamental waveguide mode which is present at the respective coupling port, and a higher waveguide mode, relative to the fundamental waveguide mode, which is present in the assigned conductor pair, or
  b) to shift the phase of electromagnetic waves of a waveguide mode by 180°, or c) to combine the conditioning according to a) and b) in one waveguide mode, meaning specifically to convert between a fundamental waveguide mode present at the respective coupling port, and a higher waveguide mode, relative to the fundamental waveguide, which is present in the assigned conductor pair, and also to shift the phase of the electromagnetic waves of the higher waveguide mode by 180°, or d) to conduct the waveguide mode in unchanged form.

There are several conceivable variants for converting between the fundamental waveguide mode and the higher waveguide mode. A mode conversion device may be embodied, for example, as an asymmetric codirectional coupler, or alternatively as a horn structure.

The conditioning device for converting between the fundamental waveguide mode and the higher waveguide mode preferably has a mode conversion device in the form of a Mach-Zehnder interferometer.

One variant of the Mach-Zehnder interferometer which is particularly suitable for integrated optical technology has a first multimode interference coupler which opens into one waveguide branch on its side that faces the coupling port, but into two parallel waveguide branches on its side that faces the conductor pair. Of the latter two parallel waveguide branches, a first waveguide branch contains a phase shifter adapted to phase-shift supplied electromagnetic waves of a waveguide mode by 180° relative to the phase in the second waveguide branch. The Mach-Zehnder interferometer also has a second multimode interference coupler facing the conductor pair, which is connected to a first and a second output branch. The result of this structure is that the higher waveguide mode is present at the end of the second multimode interference coupler facing toward the conductor pair, and the fundamental waveguide mode is present at the end of the first multimode interference coupler facing away from the conductor pair and thus facing toward the coupling port. Conversion in both directions is possible here, also. Thus, the higher waveguide mode is generated after coupling in the fundamental waveguide mode at the coupling port at the output on the conductor pair side of the Mach-Zehnder interferometer. A higher waveguide mode supplied from the conductor pair is converted into the fundamental mode of the waveguide for coupling out at the coupling port. One example of the fundamental mode is the TE00 mode. An example of a higher mode is the TE10 mode.

Each of the coupling ports preferably has a coupling grating for coupling in and coupling so out electromagnetic waves, in order to facilitate coupling to external optical or optoelectronic components.

The coupler device is preferably formed using a silicon-on-insulator technology.

The waveguides are preferably less than 1 micrometer in height, in a direction perpendicular to the substrate surface.

A preferred application of the present coupler device is an optoelectronic device comprising a light source, an integrated optical coupler device according to the invention or one of its described embodiments, an input line for electromagnetic waves emitted from the light source to the coupler device, and a conductor for electromagnetic waves outputted from the coupler device.

Another application of the invention is an optical arrangement comprising an integrated optical coupler device according to the invention or one of its embodiments, or an optoelectronic device as described in the last paragraph, and comprising an optical multimode fiber which faces the coupling grating and is suitable for coupling in and coupling out the electromagnetic waves.

BRIEF DESCRIPTION OF THE DRAWINGS

Further embodiments shall now be explained with reference to the Figures, in which.

DETAILED DESCRIPTION

The invention is based on the following realization: A structure is required which can generate a plurality of intensity maxima in an optical fiber, whose superposition results in a guided fiber mode. The greater the overlap between the superposition of the generated intensity maxima and the fiber modes, the greater the efficiency of the device.

Figure 1:
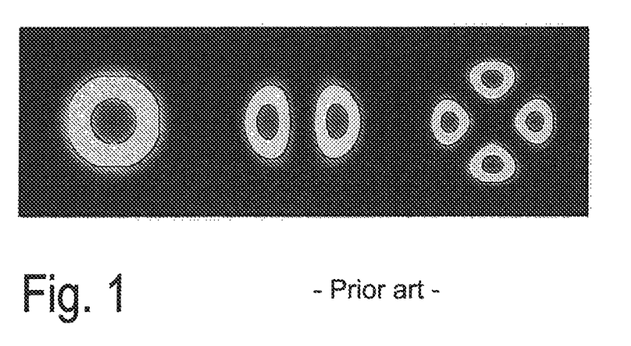
FIG. 1 shows LP fiber modes (from left to right: $LP_{01}$, $LP_{11a}$, $LP_{21a}$)
Figure 2:
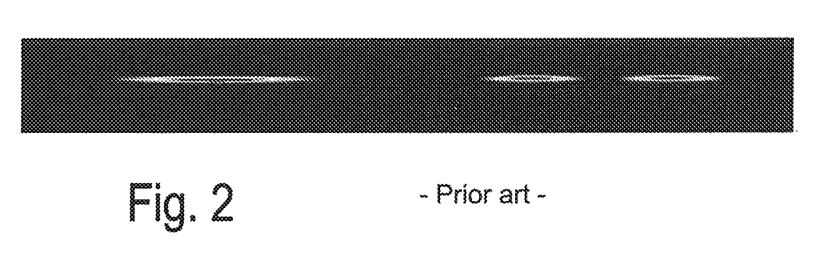
FIG. 2 shows $TE_{00}$ and $TE_{10}$ waveguide modes

In the following, the LPrφmodes in TE and TM polarization, typically found in the literature, are used as an example of fiber modes (without limiting the general validity of the solution), whereas the terms TExy and TMxy are used for modes in the integrated optical circuit. FIGS. 1 and 2 show examples of such known modes.

Figure 3:
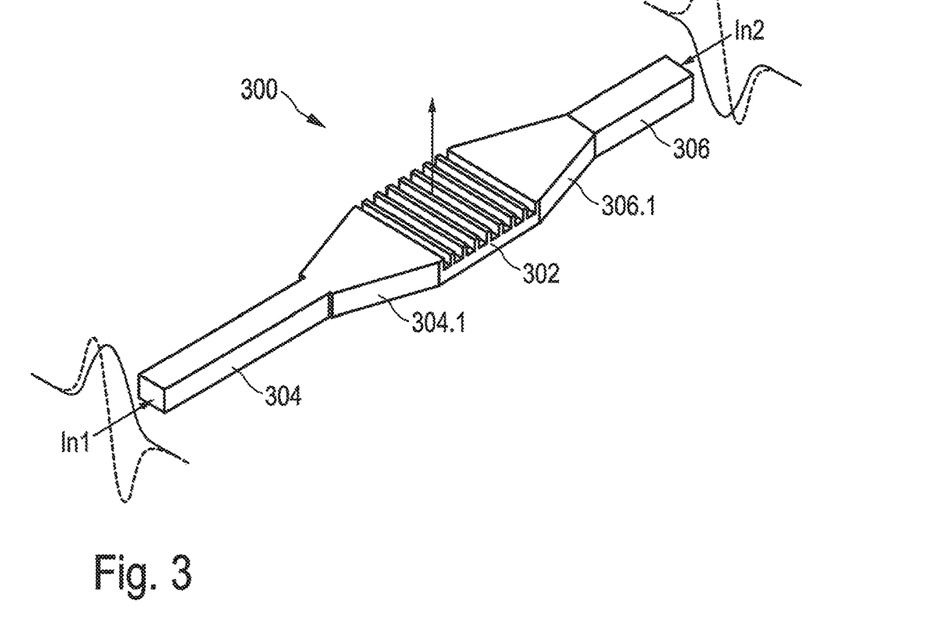
FIG. 3 shows a sketch of the grating coupler with optical fiber and integrated optical waveguides
Figure 4:
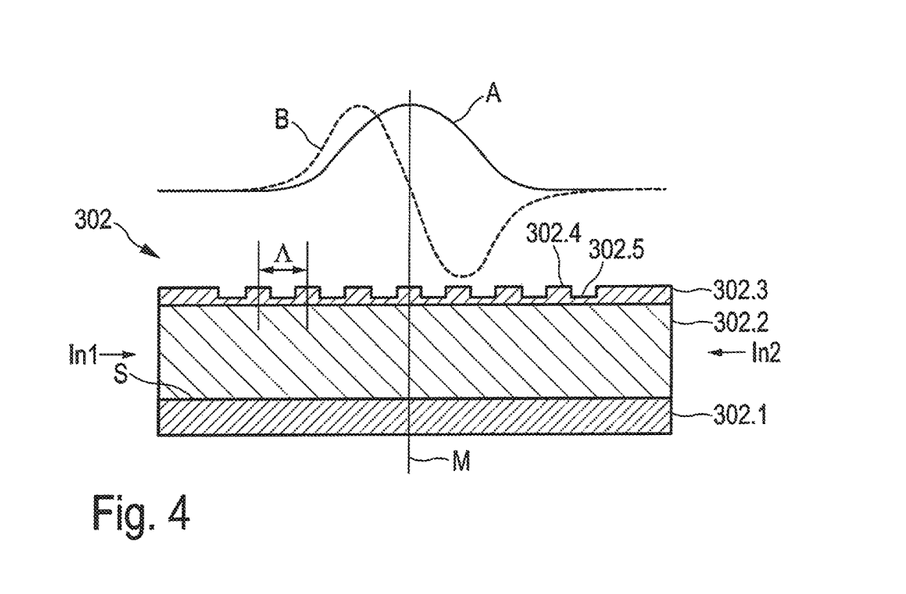
FIG. 4 shows a schematic cross-sectional view of the coupling grating in FIG. 3.

One embodiment of a coupler device 300 according to the invention is shown in FIG. 3. FIG. 4 shows a schematic cross-sectional view of the coupling grating in FIG. 3, in a plane containing a line from input In1 to input In2. The following description refers to both these figures in parallel.

An integrated one-dimensional coupling grating 302 of coupler device 300 is fed from two opposite sides with input In1 and In2, respectively, via integrated optical waveguides 304 and 306. The inputs are thus at an angle of 180° relative to each other. An optical fiber (not shown) to be coupled into is to be positioned at a distance above coupling grating 302. Waveguides 304 and 306 are adapted to guide a plurality of waveguide modes, and specifically the waveguide modes $TE_{00}$ and $TE_{10}$ in the present example. In the area adjoining coupling grating 302, waveguides 304 and 306 have portions 304.1 and 306.1 which widen like a funnel toward the coupling grating.

Coupling grating 302 is formed in an SOI substrate comprising a silicon substrate 302.1, a silicon dioxide layer 302.2 and a silicon layer 302.3 disposed thereon, and contains in silicon layer 302.3 a structure of periodically repeated, strip-shaped ribs 302.4 and adjoining strip-shaped trenches 302.5. In the view shown in FIG. 4, the strips run in a direction perpendicular to the plane of the paper.

If the fundamental $TE_{00}$ modes of the integrated optical waveguides are guided without any phase shift ($\Delta\varphi=0°$) into the two inputs In1 and In2, the two waves unite in coupling grating 302 and generate the fundamental $LP_{01}$ fiber mode in TE polarization. If, however, the $TE_{00}$ waves at inputs In1 and In2 have a phase difference of $\Delta\varphi=180°$, the two waves do not unite to form the $LP_{01}$ fiber mode, but are guided as separate intensity maxima to the fiber with a phase difference and thus generate one of the two possible $LP_{11}$ fiber modes (often referred to as $LP_{11,a}$). The other possible $LP_{11}$ fiber mode ($LP_{11,b}$) in TE polarization is formed by the superposition of $TE_{10}$ modes at inputs In1 and In2. It should be noted in this regard that the fiber modes are non-fundamental modes in the integrated waveguides and each have two intensity maxima. If these two modes are superposed in the coupling grating without any phase difference ($\Delta\varphi=0°$), respective pairs of intensity maxima (+90° and also −90° of the two inputs) merge such that the $LP_{11,b}$ fiber mode remains. If the phase difference between the two $TE_{10}$ modes at the inputs is $\Delta\varphi=180°$, all four intensity maxima are preserved on their way to the fiber and thus generate one of the possible $LP_{21}$ fiber modes, also in TE polarization.

FIG. 4 also shows electrical field distributions for the case where $\Delta\varphi=0°$ (curve A, one maximum) and for the case where $\Delta\varphi=180°$ (curve B, one maximum and one minimum). The field distribution is symmetric for $\Delta\varphi=0°$ in relation to the middle of the coupling grating (vertical line M), and antisymmetric for $\Delta\varphi=180°$. In both cases, therefore, the field which is coupled out propagates in a strictly vertical direction, that is, the radiant emission is in a direction perpendicular to the substrate surface S and shows only very slight spreading of the field profile. A suitable value for the grating period, i.e., for the distance between the middle positions of two adjacent ribs along the line connecting inputs In1 and In2, is $\Delta=570$ nm, for example. Other values for the grating period can be used. The value of the grating period influences the efficiency of the coupling grating, i.e., the spatial superposition between the electrical field at the grating and the fiber mode; cf. FIGS. 8-10.

Figure 5:
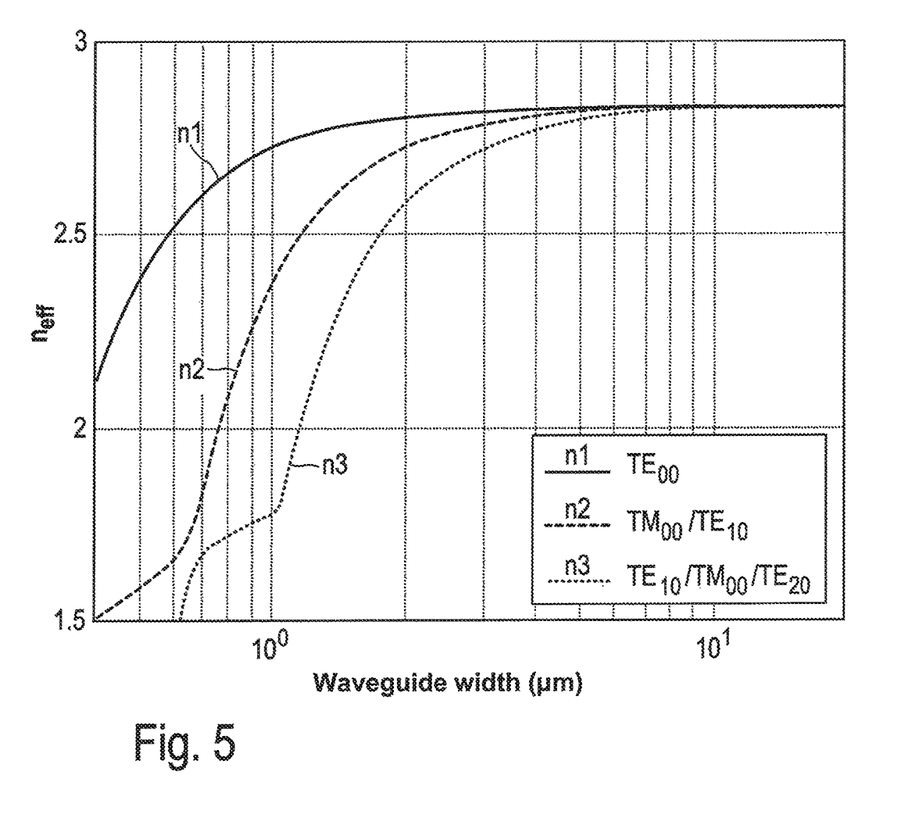
FIG. 5 shows the dependence of the effective refractive index (y-axis), shown on a linear scale, on the waveguide width (x-axis) in micrometers, shown here on a logarithmic scale.

The integrated optical waveguides have to be at least partially multimodal, as they have to guide (in the present example) not only the $TE_{00}$ modes, but also the $TE_{10}$ modes, which requires insignificantly wider waveguides. In this regard, FIG. 5 shows the dependence of the effective refractive index (y-axis), shown on a linear scale, on the waveguide width (x-axis) in micrometers, shown here on a logarithmic scale from 0.4 to 11 micrometers. Three different curves, n1, n2 and n3, show the dependence of the refractive index on waveguide mode for the first three guided modes in an SOI nanoguide with a height of 220 nm, the wavelength of light being $\lambda=1.55$ μm. The refractive index for the different modes $TE_{00}$ (top curve n1), $TM_{00}/TE_{10}$ (middle curve n2) and $TE_{10}/TM_{00}/TE_{20}$ (bottom curve n3) is identical for waveguide widths of about 10 micrometers, or more. It should be noted that the modes change position. In the example in FIG. 5, mode 2 starts as TM00 and changes after the kink to TE10.

For that reason, the waveguides preferably have a width of at least 630 nm, approximately, in those portions where they have to guide a plurality of modes. That value must be adjusted accordingly for other wavelengths.

This obviates the need to provide a separate coupling grating for higher modes.

In another embodiment, vertical waveguide dimensions ranging, for example, between 500 and 900 nanometers are used.

Figure 6:
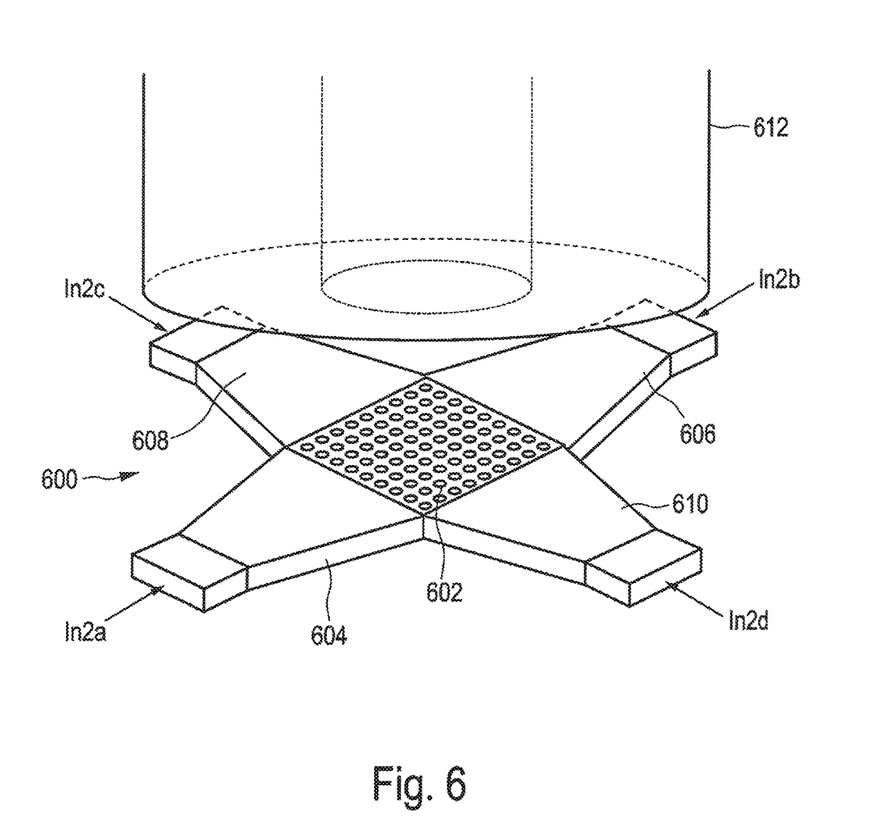
FIG. 6 shows a sketch of the grating coupler with optical fiber and integrated optical waveguides

Part of another embodiment of a coupler device 600 according to the present invention is shown in a schematic perspective view in FIG. 6. An integrated optical two-dimensional coupling grating 602 is fed from four sides via waveguides 604, 606, 608 and 610, each having a respective input In2a-In2d. The inputs and the waveguides are arranged 90° apart from other about an axis perpendicular to the plane of the grating. Cross-sectional views of the coupling grating in the cross-sectional planes 90° apart from each other, i.e., perpendicular to a straight line connecting inputs In2a and In2b and perpendicular to a straight line connecting inputs In2c and In2d correspond respectively to the view shown in FIG. 4. Instead of strip-shaped ribs and trenches, as in preceding embodiments, cylindrical recesses are arranged in array-like manner in a silicon layer in coupling grating 602. The grating period in both directions is the same as that of the grating in FIG. 4. What is not shown here is an additional epitaxial layer with a thickness of 150 nanometers that is disposed on the grating and further enhances the directionality with which light is coupled out.

An optical multimode fiber 612 into which light is to be coupled is positioned above coupling grating 602, with a gap therebetween. If the fundamental $TE_{00}$ modes of the integrated optical waveguides are guided without any phase shift ($\Delta\varphi=0°$) into input In2a and input In2b, the two waves unite in coupling grating 602 and generate the fundamental $LP_{01}$ fiber mode in TE polarization. If, however, the $TE_{00}$ waves at inputs In2a and In2b have a phase difference of $\Delta\varphi=180°$, the two waves do not unite to form the $LP_{01}$ fiber mode, but are guided as separate intensity maxima to the fiber with a phase difference and thus generate one of the two possible $LP_{11}$ fiber modes (referred to as $LP_{11,a}$), again in TE polarization. The other possible $LP_{11}$ fiber mode ($LP_{11,b}$) in TE polarization is formed by the superposition of $TE_{10}$ modes at inputs In2a and In2b. It should be noted in this regard that these are non-fundamental modes in the integrated waveguides, each mode having two intensity maxima. If these two modes are superposed in the coupling grating without any phase difference ($\Delta\varphi=0°$), respective pairs of intensity maxima (+90° from inputs In2a and In2b, and also −90° from inputs In2a and In2b) merge such that the $LP_{11,b}$ fiber mode remains. If the phase difference between the two $TE_{10}$ modes at inputs In2a and In2b is $\Delta\varphi=180°$, all four intensity maxima are preserved on their way to the fiber and thus generate one of the possible $LP_{21}$ fiber modes, also in TE polarization. This functionality corresponds thus far to the example in FIG. 3.

The same behavior is shown when inputs In2c and In2d are used instead of inputs In2a and In2b. In this case also, modes $TE_{00}$ or $TE_{10}$ are fed to the integrated waveguides and generate the respective fiber modes, but in TM polarization. Although the polarization in the integrated waveguides is still TE, the fact that inputs In2c and In2d are rotated by 90° relative to In2a and In2b means that the fields emitted by the two Input pairs are perpendicular to each other and therefore have orthogonal polarizations. The fiber modes of inputs In2a and In2b have been referred to hitherto as TE-polarized, from which it can be inferred that the fiber modes of inputs In2c and In2d are TM-polarized.

The fiber modes of inputs In2a and In2b have been referred to hitherto as TE-polarized, from which it can be inferred that the fiber modes of inputs In2c and In2d are TM-polarized. All the fiber modes which can be generated in this way are listed again in the following Table, together with the switching that is required.

TABLE 1

Figure 7:
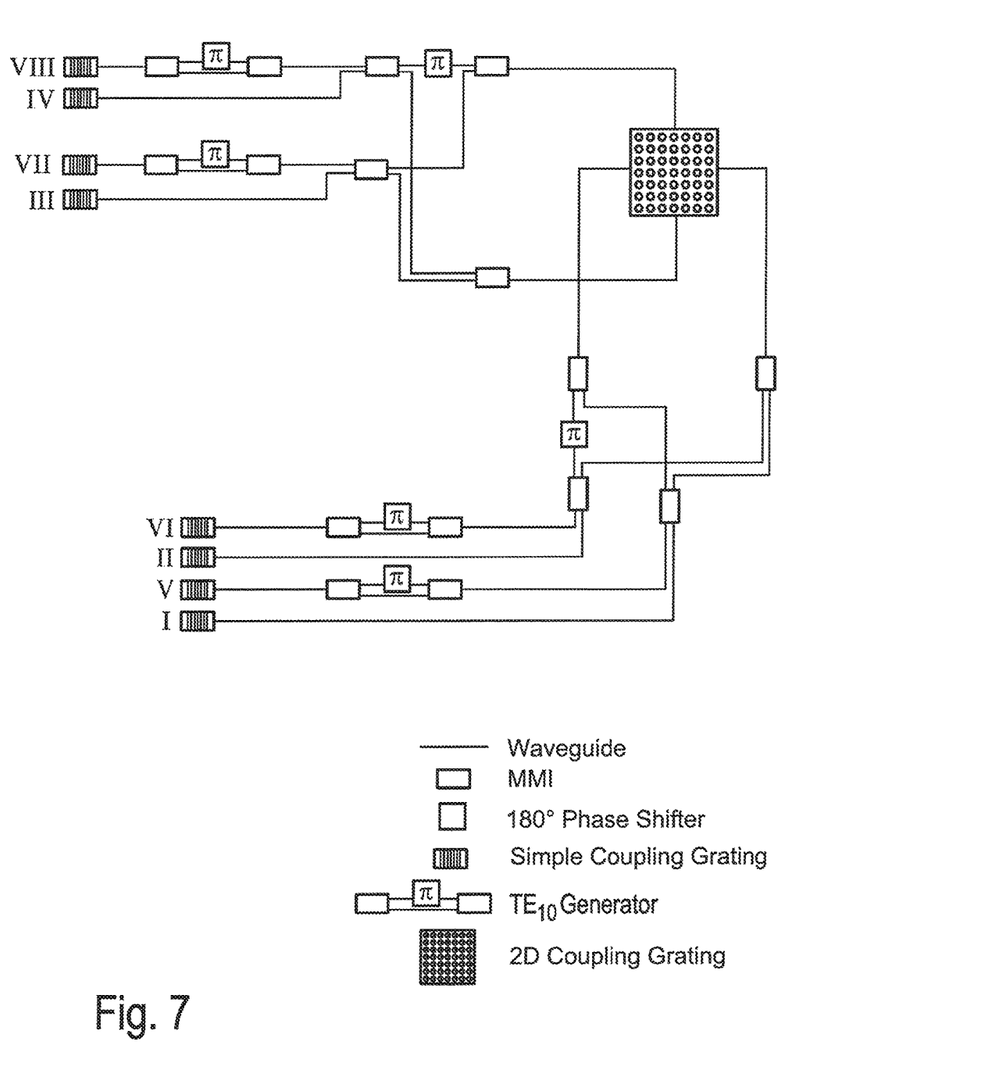
FIG. 7 shows a symbolic circuit diagram of an embodiment of the integrated optical device

Possible fiber modes (ports according to FIG. 6, In1 and In2 according to FIG. 7)

| Port | In1 | In2 | Mode | Δφ | Out | Polarization |
|---|---|---|---|---|---|---|
| I. | a | b | $TE_{00}$ | 0° | $LP_{01}$ | TE |
| II | a | b | $TE_{00}$ | 180° | $LP_{11,a}$ | TE |
| III. | c | d | $TE_{00}$ | 0° | $LP_{01}$ | TM |
| IV | c | d | $TE_{00}$ | 180° | $LP_{11,a}$ | TM |
| V | a | b | $TE_{10}$ | 0° | $LP_{11,b}$ | TE |
| VI | a | b | $TE_{10}$ | 180° | $LP_{21,a}$ | TE |
| VII | c | d | $TE_{10}$ | 0° | $LP_{11,b}$ | TM |
| VIII | c | d | $TE_{10}$ | 180° | $LP_{21,b}$ | TM |

As can be seen from the Table, only TE-polarized modes are used in the integrated optical circuit, which is advantageous, firstly, in that the losses for TE-polarized waves are less than for TM-polarized waves in small waveguides (nanowires, nanoribs) and secondly because no polarization rotators are needed in order to detect both polarizations, or because there is no need for possible modulators to be integrated for both polarizations.

In order to generate the higher modes necessary for this kind of coupling (in this case $TE_{10}$) in the photonic integrated circuit, a further device for producing a higher mode from a fundamental mode (mostly $TE_{00}$ in integrated circuits) is needed. There are various different approaches in that regard: An asymmetric codirectional coupler, in which the propagation constant of the fundamental mode of the one waveguide matches that of the desired higher mode in other waveguide, delivers the desired result, but is difficult to produce due to the low tolerance toward variations in the propagation constants of the modes in the waveguides. Another method is to convert a $TM_{00}$ mode adiabatically into a $TE_{10}$ mode by means of a horn structure (taper). This solution is very tolerant to produce, very efficient and broadband. However, the problem here is how to get TM-polarized light into the integrated optical circuit, given that coupling by means of gratings has turned out to be very inefficient in that respect and that inverse tapers entail confinement to the edge of the chip.

One embodiment of the integrated optical coupler device according to the invention that applies a different solution is shown schematically in FIG. 7. Eight simple coupling gratings are used to couple light from standard single-mode fibers into the integrated optical circuit. Each of the eight inputs generates a different LP mode at the 2D grating (cf. Table 1).

In this particular case, the device generates the $TE_{10}$ mode with the aid of a Mach-Zehnder interferometer (MZI) composed of two multimode interference couplers (MMIs) and a phase shifter on one of the arms. The first MMI splits an inbound $TE_{00}$ mode equally into two $TE_{00}$ modes, one of which is phase shifted by the phase shifter by 180° relative to the other. In the second MMI, the two modes are then superposed with phase difference to form a $TE_{10}$ mode. In other words, one 1×2 MMI splits the power into two waveguides, one of which induces a 180° phase delay of the field by means of a phase shifter, and one 2×1 MMI then superposes the field to form a $TE_{10}$ modes at an output waveguide which is about twice as wide as the input waveguide. Further phase shifters or other MMI couplers are used, depending on the input branch of the device.

Figure 8:
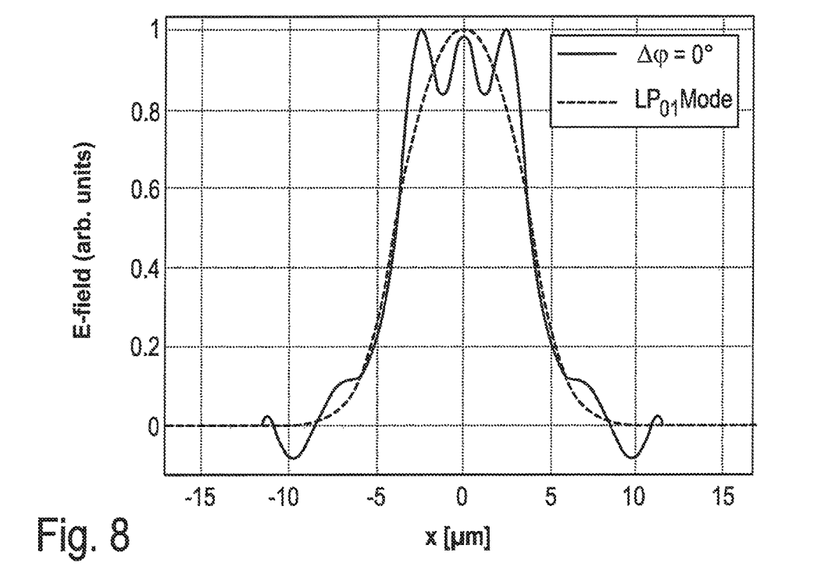
FIG. 8 shows a cross-sectional profile of the electric field with a $TE_{00}$ mode and a phase angle of $\Delta\varphi=0°$

FIG. 8 shows a cross-sectional profile of the electrical field (entered in arbitrary linear units on the y-axis) of a coupling grating excited from mutually opposite sides with a $TE_{00}$ mode having with a phase difference of Δφ=0° (blue curve with three 'spikes'), and for comparison a cross-sectional profile of the electrical field of an $LP_{01}$ fiber mode (red curve with only one maximum), both expressed as a function of position relative to a middle position of the grating (entered on the x-axis in linear units of micrometers). A large overlap is shown, thus indicating that this concept is capable of implementation.

Figure 9:
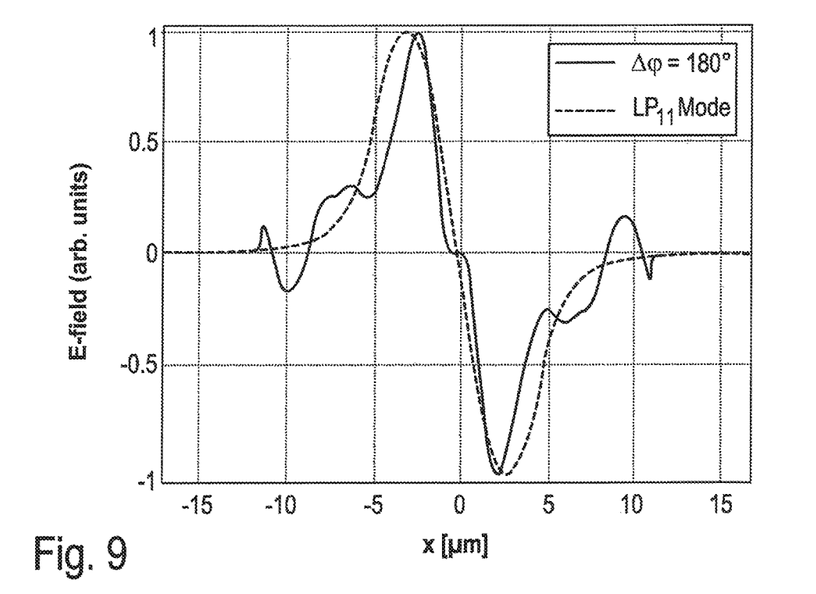
FIG. 9 shows a cross-sectional profile of the electric field with a $TE_{00}$ mode and a phase angle of $\Delta\varphi=180°$

As shown by FIG. 9, the same applies for the coupling in of higher modes. FIG. 9 shows a cross-sectional profile of the electric field (with arbitrary linear units entered on the y-axis) of a coupling grating excited from mutually opposite sides with a $TE_{00}$ mode having a phase difference of Δφ=180° (the blue curve with "spikes") and for comparison a cross-sectional profile of the electric field of an $LP_{11,b}$ fiber mode (red, smooth curve), both expressed as a function of position relative to a middle position of the grating (entered on the x-axis in linear units of micrometers).

Figure 10:
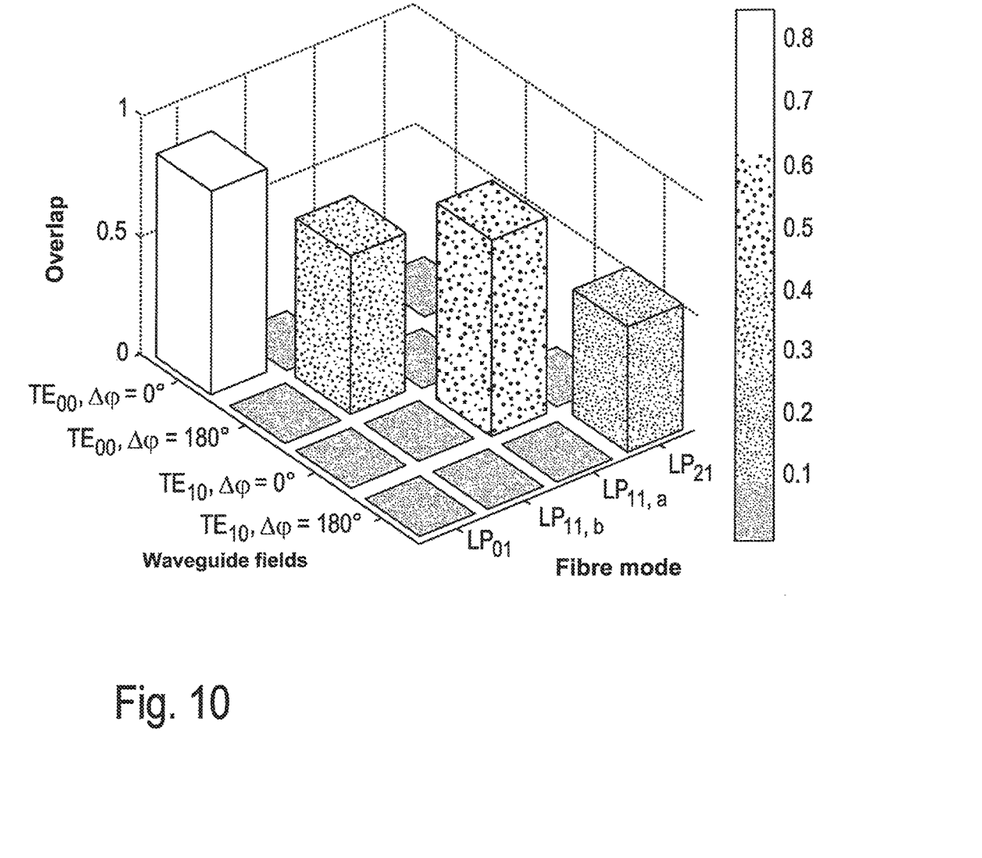
FIG. 10 shows the overlap between different grating areas and fiber modes

FIG. 10 shows the overlap between different grating areas and fiber modes for different cases. An overlap of at least 50% (for coupling into an $LP_{21}$ fiber mode) and a maximum of over 80% (for coupling into an $LP_{01}$ fiber mode) is achieved, in this case for a wavelength of 1.55 micrometers.

What is claimed is:

1. An integrated optical coupler device, for use as a coupling interface between integrated optical waveguides and an optical multimode fiber, comprising, on a substrate surface:

an integrated optical coupling grating extending in lateral directions parallel to the substrate surface, with side widths of more than 10 micrometers in each case and which, by diffraction at its grating structures, depending on the coupling direction, either converts electromagnetic waves of a mutual phase difference of 0° or 180°, guided parallel to the substrate surface, of at least two waveguide modes of integrated optical waveguides into LP fiber modes propagating perpendicularly to the substrate surface, or converts electromagnetic waves of a mutual phase difference of 0° or 180°, propagating perpendicularly to the substrate surface, of an LP fiber mode into electromagnetic waves, propagating parallel to the substrate surface, of at least two waveguide modes, and a first conductor pair, which is connected to the coupling grating at mutually opposite first and second sides of the coupling grating and which is formed by a first and a second integrated optical waveguide, through which, in mutually opposite first and second directions parallel to the substrate surface, electromagnetic waves of at least two waveguide modes can be conducted to the coupling grating or can be conducted away from the coupling grating.

2. The coupler device according to claim 1, in which the coupling grating is additionally connected at mutually opposite third and fourth sides to a second conductor pair, which is formed by a third and a fourth integrated optical waveguide, through which, in mutually opposite third and fourth directions parallel to the substrate surface and perpendicular to the first and second directions, electromagnetic waves of at least two waveguide modes can be conducted to the coupling grating or can be conducted away from the coupling grating, and in which the coupling grating is formed as a two-dimensional coupling grating which has a grating structure in two directions of the grating plane perpendicular to each other and to two of the directions of incidence.

3. The coupler device according to claim 2, comprising an integrated optical conditioning device which has more than two coupling ports assigned to each conductor pair, for coupling in and coupling out electromagnetic waves from or to the outside, wherein each of the coupling ports is connected to both waveguides of the conductor pair assigned to it, and wherein the conditioning device assigns a conditioning path to each coupling port by being adapted, depending on the coupling port used,
a) either to convert between a fundamental waveguide mode which is present at the respective coupling port, and a higher waveguide mode, relative to the fundamental waveguide mode, which is present in the assigned conductor pair, or
b) to shift the phase of electromagnetic waves of a waveguide mode by 180°, or
c) to combine the conditioning according to a) and b), in one waveguide mode, or
d) to conduct the waveguide mode in unchanged form.

4. The coupler device according to claim 3, wherein the coupling ports each have a coupling grating for coupling in and coupling out electromagnetic waves.

5. The device according to claim 3, in which the conditioning device for converting between the fundamental waveguide mode and the higher waveguide mode has a mode conversion device which is either an asymmetric codirectional coupler, or forms a horn structure.

6. The coupler device according to claim 3, wherein the conditioning device for converting between the fundamental waveguide mode and the higher waveguide mode has a mode conversion device in the form of a Mach-Zehnder interferometer.

7. The coupler device according to claim 6, in which the Mach-Zehnder interferometer
has a first multimode interference coupler which opens into two parallel waveguide branches on its side that faces the conductor pair, wherein a first waveguide branch of the two parallel waveguide branches contains a phase shifter adapted to shift the phase of supplied electromagnetic waves of a waveguide mode by 180° relative to a Phase in a second waveguide branch, and
has a second multimode interference coupler facing the conductor pair, which is connected to a first and a second output branch such that
the higher waveguide mode is present at the end of the second multimode interference coupler facing toward the conductor pair, and the fundamental waveguide mode is present at the end of the first multimode interference coupler facing away from the conductor pair.

8. The coupler device according to claim 7, wherein the coupling ports each have a coupling grating for coupling in and coupling out electromagnetic waves.

9. The coupler device according to claim 7, wherein the coupling grating has a translucent cover layer.

10. The coupler device according to claim 9, the coupler device being produced using silicon-on-insulator technology.

11. The coupler device according to claim 9, the waveguides thereof being less than 1 micrometer high in a direction perpendicular to the substrate surface.

12. An optoelectronic device comprising a light source, an integrated optical coupler device according to claim 1, an input line for electromagnetic waves emitted from the light source to the coupler device, and a conductor for electromagnetic waves outputted from the coupler device.

13. An optoelectronic device comprising an integrated optical coupler device according to claim 12, and comprising an optical multimode fiber which faces the coupling grating and is suitable for coupling in and coupling out the electromagnetic waves.

14. An optical arrangement comprising an integrated optical coupler device according to claim 1, and comprising an optical multimode fiber which faces the coupling grating and is suitable for coupling in and coupling out the electromagnetic waves.

15. The coupler device according to claim 1, comprising an integrated optical conditioning device which has more than two coupling ports assigned to each conductor pair, for coupling in and coupling out electromagnetic waves from or to the outside, wherein each of the coupling ports is connected to both waveguides of the conductor pair assigned to it, and wherein the conditioning device assigns a conditioning path to each coupling port by being adapted, depending on the coupling port used,
a) either to convert between a fundamental waveguide mode which is present at the respective coupling port, and a higher waveguide mode, relative to the fundamental waveguide mode, which is present in the assigned conductor pair, or
b) to shift the phase of electromagnetic waves of a waveguide mode by 180°, or
c) to combine the conditioning according to a) and b), in one waveguide mode, or
d) to conduct the waveguide mode in unchanged form.

16. The device according to claim 15, in which the conditioning device for converting between the fundamental waveguide mode and the higher waveguide mode has a mode conversion device which is either an asymmetric codirectional coupler, or forms a horn structure.

17. The coupler device according to claim 15, wherein the conditioning device for converting between the fundamental waveguide mode and the higher waveguide mode has a mode conversion device in the form of a Mach-Zehnder interferometer.

18. The coupler device according to claim 17, in which the Mach-Zehnder interferometer
has a first multimode interference coupler which opens into two parallel waveguide branches on its side that faces the conductor pair, wherein a first waveguide branch of the two parallel waveguide branches contains a phase shifter adapted to shift the phase of supplied electromagnetic waves of a waveguide mode by 180° relative to a phase in a second waveguide branch, and
has a second multimode interference coupler facing the conductor pair, which is connected to a first and a second output branch such that
the higher waveguide mode is present at the end of the second multimode interference coupler facing toward the conductor pair, and the fundamental waveguide mode is present at the end of the first multimode interference coupler facing away from the conductor pair.

19. The coupler device according to claim 1, wherein the coupling grating has a translucent cover layer.

20. The coupler device according to claim 1, the coupler device being produced using silicon-on-insulator technology.

21. The coupler device according to claim 1, the waveguides thereof being less than 1 micrometer high in a direction perpendicular to the substrate surface.

* * * * *